US009914526B2

(12) United States Patent
Reiss et al.

(10) Patent No.: US 9,914,526 B2
(45) Date of Patent: Mar. 13, 2018

(54) GALLEY SYSTEM, METHOD FOR OPERATING ELECTRICAL GALLEY DEVICES, AND USE OF A FUEL CELL IN A GALLEY SYSTEM

(71) Applicant: Airbus Operations GmbH, Hamburg (DE)

(72) Inventors: Matthias Reiss, Hamburg (DE); Yener Palit, Hamburg (DE); Thorsten Otto, Hamburg (DE); Andreas Westenberger, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 277 days.

(21) Appl. No.: 14/886,717

(22) Filed: Oct. 19, 2015

(65) Prior Publication Data
US 2016/0114880 A1 Apr. 28, 2016

(30) Foreign Application Priority Data
Oct. 22, 2014 (EP) .................................. 14 189 939

(51) Int. Cl.
| | |
|---|---|
| *B60L 1/00* | (2006.01) |
| *B64C 11/04* | (2006.01) |
| *B64D 11/04* | (2006.01) |
| *B64D 41/00* | (2006.01) |

(52) U.S. Cl.
CPC .............. *B64C 11/04* (2013.01); *B64D 11/04* (2013.01); *B64D 41/00* (2013.01); *Y02T 50/46* (2013.01)

(58) Field of Classification Search
CPC ......... B64D 11/04; B64D 41/00; Y02T 50/46; B64C 11/04

USPC ........................................................ 307/10.1
See application file for complete search history.

(56) References Cited

U.S. PATENT DOCUMENTS

| | | | | |
|---|---|---|---|---|
| 3,709,736 A | * | 1/1973 | Adlhart et al. | H01M 8/2415 429/442 |
| 2008/0178609 A1 | * | 7/2008 | Hoffjann | B64D 11/04 62/7 |
| 2010/0071386 A1 | * | 3/2010 | Reiss | B64D 11/04 62/3.61 |
| 2014/0291449 A1 | | 10/2014 | Knepple et al. | |

(Continued)

FOREIGN PATENT DOCUMENTS

| | | |
|---|---|---|
| WO | 2007085096 A1 | 8/2007 |
| WO | 2013136286 A2 | 9/2013 |

OTHER PUBLICATIONS

European Patent Office, European Search Report for European Patent Application No. 141899393 dated Oct. 4, 2015.

*Primary Examiner* — Jared Fureman
*Assistant Examiner* — Duc M Pham
(74) *Attorney, Agent, or Firm* — Lorenz & Kopf, LLP

(57) ABSTRACT

A galley system comprises at least one electrically operated galley device, at least one fuel cell, a plurality of compartments for housing the galley devices, and an air extraction means. At least one of the plurality of compartments comprises at least one air extraction port couplable with the air extraction means. The at least one compartment is adapted for housing at least one of the at least one fuel cell and for removing at least a part of heat emanated from the at least one fuel cell through the air extraction means. At least one of the at least one electrically operated galley device is electrically couplable with the at least one fuel cell unit.

14 Claims, 1 Drawing Sheet

(56) References Cited

U.S. PATENT DOCUMENTS

2015/0028670 A1* 1/2015 Boodaghians ......... B64D 11/04
307/9.1
2015/0155574 A1* 6/2015 Kwon ............... H01M 8/04089
429/429

* cited by examiner

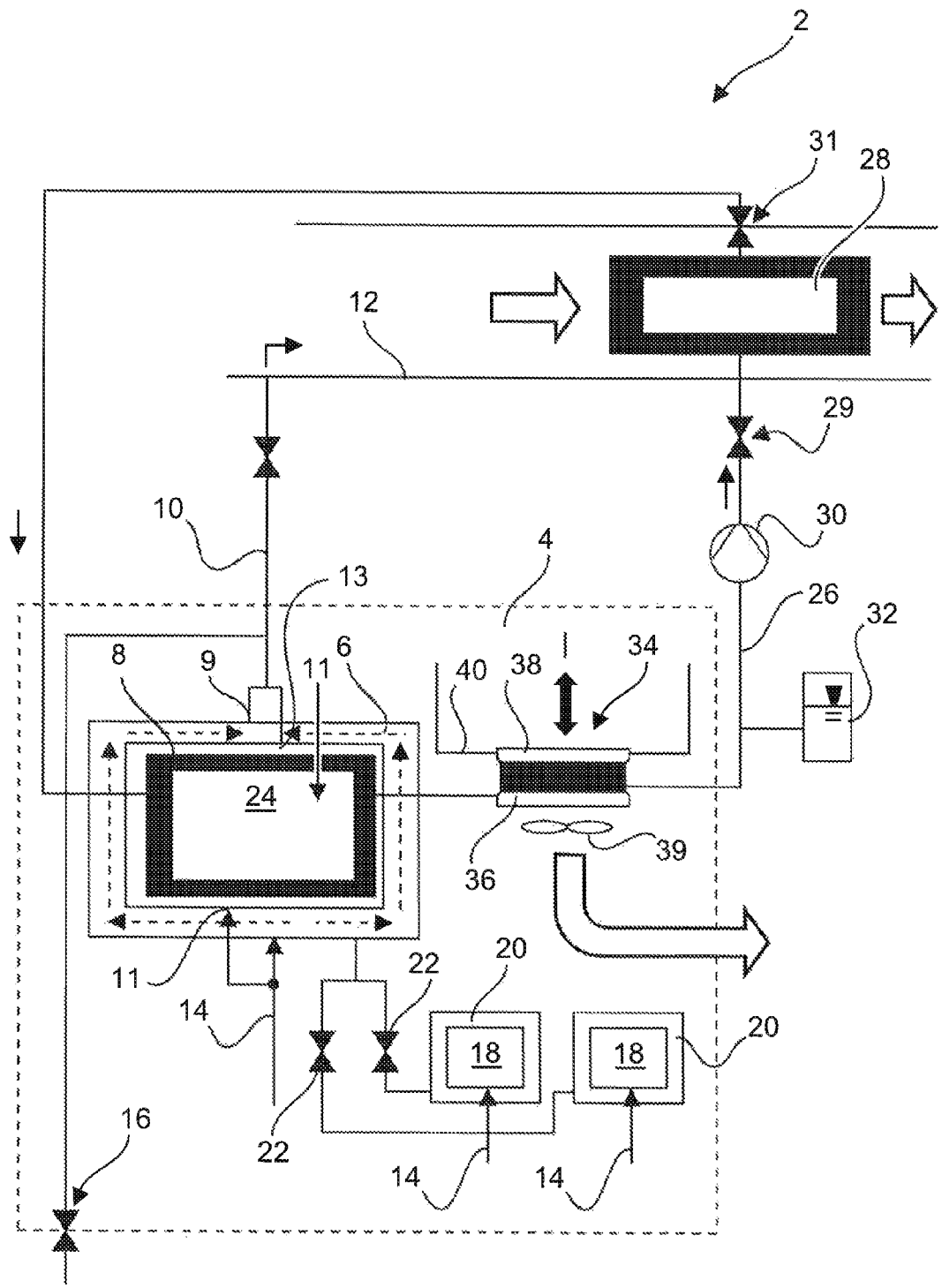

GALLEY SYSTEM, METHOD FOR OPERATING ELECTRICAL GALLEY DEVICES, AND USE OF A FUEL CELL IN A GALLEY SYSTEM

CROSS-REFERENCE TO RELATED APPLICATION

This application claims priority to European Patent Application No. 14 189 939.3, filed 22 Oct. 2014, which is incorporated herein by reference in its entirety.

TECHNICAL FIELD

The embodiments relate to a galley system, a method for operating electrical galley devices, and the use of an air breathing fuel cell in a galley.

BACKGROUND

In addition, other objects, desirable features and characteristics will become apparent from the subsequent summary and detailed description, and the appended claims, taken in conjunction with the accompanying drawings and this background.

A galley section in a cabin of an aircraft often comprises a variety of electrical galley inserts (GAIN), which are connected to an electric network, which may be supplied with electrical power generated by main engines of an aircraft.

The heat generated by the GAIN is typically disposed of into the cabin, while the environmental control system of the aircraft maintains the cabin air temperature at the selected temperature through its cooling function. Further, in some cases the heat of the GAIN is transferred into a Supplemental Cooling System (SCS), which is primarily designed to ensure the cold chain of food storage within the aircraft (galley cooling). Moreover, steam and heat not absorbed by food and beverages may partly be extracted by a Cabin Air Extraction System, wherein the steam and waste heat is mainly generated by ovens or freezers.

The use of fuel cells for providing electrical energy for certain consumers in an aircraft is known. However, usually a fuel cell produces a considerable amount heat during the generation of electrical power, which leads to a distinct cooling demand. Even though the generation of electrical power by means of fuel cells in aircraft is known, this mainly applies to emergency systems.

SUMMARY

Hence, it is an object to propose a galley system, which comprises an increased independence from basic electrical power supply systems on board in order to provide a larger flexibility in the choice of galley configuration selection during customization while increasing the overall energy efficiency on aircraft level by optimizing the most suitable balance between power generation and power consumption.

A galley system is proposed, comprising at least one electrically operated galley device, at least one fuel cell, a plurality of compartments for housing the galley devices, and an air extraction means. At least one of the plurality of compartments comprises an air extraction port couplable with the air extraction means, wherein the at least one compartment is adapted for housing at least one of the at least one fuel cell and for removing at least a part of heat emanated from the at least one fuel cell through the air extraction means. At least one of the at least one electrically operated galley device is electrically couplable with the at least one fuel cell.

Electrically operated galley devices are consumers of electrical energy, such as electrical galley inserts (GAIN), which may include ovens, coffee makers, freezers, and other devices. Commonly, these galley devices consume a large fraction of available electrical power provided through an electrical network, which are preferably fed by engine operated generators. Further, they may also generate a large amount of heat.

A galley device is inserted into an associated compartment of the galley. Especially for galley devices that produce odors, heat and/or water vapor, it is advantageous to conduct an air extraction through the suction port arranged in the associated compartment. The air extraction means may be any means that is capable of sucking or conveying air from the galley to another compartment, interior space, or the surrounding of the aircraft. The air extraction means may comprise an active air conveying means, such as a fan or a blower, or a passive air conveying means, such as a device that is based on the Venturi principle.

The fuel cell unit may comprise at least one fuel cell, e.g. a single fuel cell, a fuel cell stack or a plurality of fuel cell stacks, wherein the at least one fuel cell is able of conducting a fuel cell process under consumption of hydrogen and air for generating electric power, oxygen depleted air, and water. Also, instead of air, another oxygen containing gas or pure oxygen may be used, wherein in the latter case the generation of oxygen depleted air is not possible. The fuel cell itself may be of any suitable type, which may include a low temperature, a medium temperature or a high temperature fuel cell type that produces electricity and heat. For the use in vehicles, the fuel cell may preferably include proton exchange membrane fuel cells, also known as polymer electrolyte membrane fuel cells (PEMFC).

For the purpose of removing heat from the at least one fuel cell, the fuel cell may be an air cooled fuel cell, which comprises means for transferring thermal energy from inside the at least one fuel cell to a surrounding airflow induced by the air extraction through the at least one air extraction port. The heat transfer may be accomplished through any heat dissipating means imaginable, such as heat transfer fins, through-flow openings, conduits and/or in general an open cathode fuel cell design. The air may flow through the fuel cell and/or around a housing of the fuel cell, which may also be heat dissipating.

It goes without saying that the fuel cell unit may additionally be thermally coupled with a cooling system based on a liquid coolant, which supports the air extraction based cooling. However, means for transferring heat to a liquid coolant may be reduced in size, which leads to a lower total weight compared to a fuel cell, which is exclusively cooled by means of a liquid coolant based cooling system.

It is an object that a fuel cell may be thermally coupled to an already existing air extraction means installed in a galley system, drawing at least a part of the heat generated in the fuel cell process during the air extraction by constantly providing a sufficient flow of air with a comparably low temperature over a heat dissipating surface in thermal contact with the fuel cell. The entire compartment within the galley, in which the fuel cell is located, may be ventilated with airflow used for cabin air extraction. This may consist of the air, which has been used for other consumers (e.g. steam exhaust inlets) in order to minimize the entire flow requirements of the galley.

Hence, the galley system simply and decentrally provides electrical power to the galley devices and, at the same time, allows a cooling of the fuel cell without any additional or with smaller cooling means that comprises a comparably low weight.

In an exemplary embodiment, the at least one fuel cell may be an air-breathing fuel cell. For providing air to the fuel cell unit, a separate oxygen supply means is not necessary, which in turn reduces the weight of the system. Preferably, the air-breathing fuel cell comprises an air inlet and an exhaust outlet, which exhaust outlet is couplable with the air extraction means. Air, which is needed for the fuel cell process, is constantly soaked through the fuel cell and afterwards merged with all other branches of devices, which take advantage of cabin air extraction. Air, which passes through a cathode side of the fuel cell allowing sufficient flow of oxidant to the fuel cell as well as providing a certain cooling function.

In an advantageous embodiment, the fuel cell is an open cathode fuel cell. An open cathode fuel cell may comprise a plurality of air flow conduits at a cathode side, through which air from a cathode inlet may flow. Besides providing the oxygen for the fuel cell process, the airflow may also provide a cooling function to at least support maintaining a certain fuel cell temperature, as it enables a heat transfer over a relatively large surface area. Preferably, the fuel cell unit is an open cathode PEM fuel cell stack.

In a further advantageous embodiment, the galley system comprises a first heat exchanger thermally coupled with the at least one fuel cell and thermally coupled with a cooling loop comprising a heat sink. The first heat exchanger does not necessarily constitute a separate heat exchanger, but may also be realized by conduits or channels in the at least one fuel cell unit or a fuel cell housing, which allow the through-flow of a fluid. Hence, the first heat exchanger and the heat sink are coupled through a cooling loop, in which the fluid flows. The cooling loop may comprise a circulation pump to maintain a flow of the fluid. Through the cooling loop, the at least one fuel cell unit faces a supplemental cooling, by which heat arising in the at least one fuel cell is transferred to the heat sink of the cooling loop. The cooling loop, which may also be referred to as a coolant loop, comprises a conduit in which a coolant circulates in order to transport heat from a heat source to a heat sink. The cooling loop in the system may be of any suitable kind, which does not consume excessive installation space and allows to sufficiently transfer heat. The coolant, which may also be referred to as a refrigerant, may be any suitable liquid or a gas, while it may be preferred to use a liquid coolant having a high thermal capacity and a low viscosity. Still further, the coolant may preferably be chemically inert and does neither cause nor promote corrosion of any components in fluid communication with the cooling loop. Depending on the first heat exchanger, it may also be preferred to use a non-conductive coolant, i.e. an electrical insulator. The coolant may furthermore be either a non-phase or phase changing fluid in the given frame conditions.

In particular, the heat sink may comprise a second heat exchanger, which is thermally coupled with the cooling loop and placed in an air channel of the aircraft. In this regard, the air channel is a conduit through which air flows during the operation of the aircraft. The air channel may be realized by different means, which may include internal air conduits of another system, such as an air conditioning system, a ventilation system or an air based cooling system. However, the air channel may also be realized as an air channel comprising an opening extending into the surrounding of the aircraft. Preferably, the air flow through the air channel is constant as long as the cooling loop is active. By placing the second heat exchanger in an air channel, heat may be disposed of simply through transferring heat from the second heat exchanger to the through-flowing air. For this purpose, the second heat exchanger may comprise at least one heat dissipating surface that is impinged with air flowing through the air channel, such as fins or conduits, etc.

In particular, the at least one second heat exchanger is placed in at least one of a cabin extraction air channel and a ram air channel. For allowing a sufficient airflow in operation phases, where the aircraft is on ground or where cabin air extraction is not conducted, a fan may further support a sufficient flow through the respective air channel. In case the cooling loop comprises a phase changing fluid as a coolant, the second heat exchanger acts as a condenser, while the first heat exchanger acts as an evaporator.

If the heat exchangers act as evaporator and condenser, the pressure in at least a section of the cooling loop should be controlled by means of at least one valve, e.g. at a condenser inlet and/or outlet, depending on the flow rate and temperature expected in the cooling loop. For instance, condensation may be accomplished at a higher pressure level than evaporation, leading to an increase in a driving temperature difference to the ambient respectively and to a minimization of the size of the heat exchangers. However, this may require an additional compressor and a throttle within the cooling loop.

Also, the cooling loop may comprise a common setup, which may include a reservoir to cope with possible leakages in the system.

In an advantageous embodiment, the galley system may comprise a control unit, which is coupled with the air extraction means and the at least one fuel cell, wherein the control unit is adapted for interrupting an operation of the at least one fuel cell in case the air extraction means is inactive. The control unit may be coupled with the air extraction means and the fuel cell by means of a bus, a network or another signal transferring connection, which allows to determine the operating status of the air extraction means and for controlling the at least one fuel cell. Through such a control logic an overheat of the at least one fuel cell may be prevented, when the air extraction means is inoperative. Further, the ventilation of the dedicated fuel cell compartment contributes to a better thermal management and to remove possible hydrogen traces from the galley. The control unit may be a separate control unit or it may be integrated into an existing control unit, such as a cabin air extraction control unit.

In another advantageous embodiment, the fuel cell unit may comprise a Peltier element having a first side and a second side, wherein the first side is thermally coupled with the at least one fuel cell and wherein the second side is coupled with a heat sink or a component of a cooling device having a temperature clearly below an operating temperature of the fuel cell. Hence, the Peltier element is facing a clear temperature difference between the first side and the second side, such that, based on the inverse Peltier effect, an electrical current is produced, which may either be fed into an electrical network of the aircraft or provided to auxiliary components in the galley system, which may include e.g. a battery charger or another low current consuming devices.

The coolant provided by the supplemental cooling system may be directly connected to the fuel cell. Particularly, the second side of the Peltier element may be thermally coupled with a return line or a supply line of a supplemental cooling system. A supplemental cooling system may be based on a secondary loop cooling technology and particularly provides cooling for food trolleys situated in at least one galley in the aircraft cabin, e.g. in the form of a remote chiller, for devices associated with in-flight entertainment (IFE) and, furthermore, for aircraft avionics during hot ground operation. The supplemental cooling system may comprise a cooling loop having a feed line and a return line. Also, the second side may be coupled with a return air line from a galley cooling system, before it is re-ingested into air chillers on board the aircraft.

Particularly, this connection to the galley cooling system or another supplemental cooling system provides an opportunity to remove a part of the heat load into this in the flight phase since there is extra capacity of the galley cooling system available. The design point for such a cooling system commonly is the ground case, which is requires a much larger cooling capacity for galley cooling purposes.

This also relates to a method for operating electrical galley devices, comprising the steps of extracting air from a compartment arranged in a galley system, in which at least one fuel cell is arranged, operating the at least one fuel cell under removal of at least a part of heat emanating from said fuel cell by the air extraction, and supplying electrical power to at least one electrically operated galley device.

Still further, the method may comprise conveying air through the at least one fuel cell, which is an air-breathing fuel cell, for providing oxygen for the fuel cell process conducted in the fuel cell.

The method may further comprise the step of providing supplemental cooling through conveying a cooling fluid from a first heat exchanger, which is coupled with the at least one fuel cell, to a heat sink.

In a still further advantageous embodiment, the method comprises the step of transferring heat from the at least one fuel cell to a first side of a Peltier element and thermally coupling a second side of the Peltier element with a heat sink in order to generate electrical power.

Still further, this relates to the use of a fuel cell in a galley system for providing electrical power to galley devices.

BRIEF DESCRIPTION OF THE DRAWINGS

The various embodiments will hereinafter be described in conjunction with the following drawing figures, wherein like numerals denote like elements, and:

FIG. 1 is a schematic view of a galley system according to an embodiment;

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

FIG. 1 shows an exemplary embodiment of a galley system 2 in a schematic view. For the sake of simplification, a hydrogen supply system is not illustrated. Here, a galley housing 4 is indicated by means of a dashed line, which galley housing may comprise a plurality of compartments for housing electrical devices, i.e. galley inserts (GAIN). Exemplarily, a first compartment 6 is shown, in which a fuel cell unit 8 is installed. As indicated by dashed arrows in the space between the outer limitations of the first compartment 6 and the fuel cell unit 8, an air extraction is conducted, leading to extraction of air from the first compartment 6 through an air extraction means 10 outside the first compartment 6. In this case, the air extraction means 10 may be a cabin air extraction means having a main cabin air extraction air channel 12.

Through application of a suction pressure through the air extraction means 10 at an air extraction port 9, air 14 is sucked into an inlet 11 of the fuel cell unit 8, flows out of an outlet 13 (hidden behind the fuel cell unit 8) and into the air extraction means 10. In the fuel cell unit 8 the oxygen content of the air is used as an oxidant for conducting the fuel cell process. For this purpose, the fuel cell unit 8 may comprise an open cathode fuel cell, which allows air to flow through a cathode of the fuel cell, where it is oxygen depleted during the fuel cell process.

The air 14 may originate from the cabin and enter the fuel cell unit 8 through a front side of the galley 4 or the first compartment 6 or, as an alternative, through dedicated openings at the top or side surfaces of the galley 4. The temperature of the air is determined by the air conditioning of the cabin and may be in small range above 20° C., when the aircraft is in normal operation. This temperature level of the air allows to efficiently cool the fuel cell unit 8 by flowing through it.

Air that has passed through the fuel cell unit 8 and enters the air extraction means 10 may be oxygen depleted and, due to the fuel cell process, comprise a certain amount of water vapour. It is to be expected that water vapour may partially condensate in ducts associated with the air extraction means 10, requiring its disposal exemplarily through an air stop valve 16, which may be placed at the lowest point of a ducting connected to the air extraction means and can be discharged from here with the air stop valve into a drainage system of the aircraft.

In the galley, further galley devices 18 may be arranged in dedicated second compartments 20, which are indicated in a very schematic view and not to scale. The air extraction means 10 may be used for extracting air from the second compartments 20, exemplarily connected to the second compartments 20 via valves 22, located upstream of the first compartment 6 and/or in branches parallel to the fuel cell unit 8.

As indicated above, the fuel cell unit 8 may include one or more fuel cells or fuel cell stacks, which are air breathing and, exemplarily, realized as open cathode fuel cells. These allow to use air as an oxidant and may furthermore be at least partially cooled through the constant air extraction. However, depending on the required power from the fuel cell unit 8, supplemental cooling may be necessary. For this purpose, the fuel cell unit 8 comprises a first heat exchanger 24, which is thermally coupled with the fuel cells inside the fuel cell unit 8. The first heat exchanger 24 is not necessarily a separate component, but instead may also comprise one or more conduits in fuel cell housings, through which a coolant may flow in order to receive heat from the respective fuel cell.

The disposal of heat is conducted through a liquid cooling loop 26, which connects the first heat exchanger 24 with a second heat exchanger 28 by means of a pipe, hole, line, conduit, channel or any other suitable transport means that allows the transport of a cooling liquid. In the cooling loop 26, a circulation pump 30 is arranged, which may be powered by the fuel cell unit 8 or through an independent source of electrical power. The pressure and flow rate through the cooling loop 26 may be adjusted by means of a first valve 29 upstream of the second heat exchanger 28 and a second valve 31 downstream of the second heat exchanger 28. A reservoir 32 is connected to the cooling loop 26 for compensation of any potential leakage and expansion effects.

The second heat exchanger 28 may be arranged in a cabin air extraction channel 12 or a ram air channel, which may also be equipped with a fan (not illustrated), such that a sufficient flow of ambient air may be achieved even when the aircraft is on ground.

As the fuel cell process not only leads to the generation of electrical power, approximately the same amount of heat arises. It is beneficial to not only dispose of the heat, but also to use the heat for other purposes to increase the efficiency of the galley system 2. Exemplarily, the galley system 2 comprises a Peltier element 34, which is thermally coupled with the cooling loop 26, such that a first side 36 of the Peltier element 34 is constantly heated. A second side 38 may instead be coupled with an element that comprises a distinctly lower temperature. As galleys may often comprise cooling for trolleys and other components, a fluid line 40 of a supplemental cooling system or an air chiller may be used for this purpose. Hence, the fluid line 40 acts as a heat sink for the Peltier element 34, as a cooled liquid flows through the fluid line 40 and thereby cools the second side 38 of the Peltier element 34. Consequently, a constant temperature difference is present, which leads to the generation of electrical power due to the inverse Peltier effect.

Another fraction of the heat that arises in the fuel cell unit may be used for heating air that flows into a space directly in front of the galley system 2, such that the space in front of the galley system 2 comprises a convenient temperature and the thermal comfort in the galley area is improved. This may be accomplished through a blower 39, which blows air over the first side 36 of the Peltier element 34, such that the air is heated.

It is to be noted that the temperature on the (warmer) first side 36 is controllable by controlling the electrical energy flux through the Peltier element 34. In other words, either the resulting current is controllable to establish a certain temperature level on the first side 36 or the colder second side 38 of the Peltier element 34. Also, the resulting current may be maximized depending on the available temperature difference across the Peltier element 34.

In case icing occurs during the cooling of the Peltier element 34, its polarity may simply be reversed, such that it is heated, thereby leading to melting any ice that has accumulated.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A galley system, comprising:
   at least one electrically operated galley device,
   at least one fuel cell,
   a plurality of compartments for housing the galley devices, and
   an air extraction means in the form of an already existing air extraction means installed in the galley system, allowing to draw at least a part of heat generated in a fuel cell process during air extraction by constantly providing a sufficient flow of air with a comparably low temperature over a heat dissipating surface in thermal contact with the at least one fuel cell,
   wherein at least one of the plurality of compartments comprises at least one air extraction port couplable with the air extraction means,
   wherein the at least one compartment is adapted for housing at least one of the at least one fuel cell and for removing at least a part of heat emanated from said at least one fuel cell through the air extraction means, and
   wherein at least one of the at least one electrically operated galley device is electrically couplable with the at least one fuel cell unit.

2. The galley system of claim 1, further comprising a first heat exchanger, which is thermally coupled with the at least one fuel cell and thermally coupled with a cooling loop comprising a heat sink.

3. The galley system of claim 2, wherein the heat sink comprises a second heat exchanger situated in an air channel for disposing of heat.

4. The galley system of claim 3, further comprising a galley monument,
   wherein the plurality of compartments is situated in the galley monument, and
   wherein the air channel is positioned remote from the galley monument.

5. The galley system of claim 3, wherein the second heat exchanger is placed in at least one of a cabin extraction air channel and a ram air channel.

6. The galley system of claim 1,
   further comprising a control unit, which is coupled with the air extraction means and the at least one fuel cell, and
   wherein the control unit is adapted for interrupting an operation of the at least one fuel cell in case the air extraction means is inactive.

7. The galley system of claim 1,
   further comprising at least one Peltier element having a first side and a second side, and
   wherein the first side is thermally coupled with the at least one fuel cell and wherein the second side is coupled with a heat sink.

8. The galley system of claim 7, wherein the heat sink is a fluid line, in particular a return or a supply line, of a supplemental cooling system.

9. The galley system of claim 7, further comprising a blower for letting air flow over the Peltier element for heating the air and for conveying the heated air into a region in or adjacent to the galley system for improving the thermal comfort.

10. The galley system of claim 1, wherein the at least one fuel cell comprises an air-breathing fuel cell comprising an air inlet and an exhaust outlet, which exhaust outlet is couplable with the air extraction means for conveying air through the air-breathing fuel cell.

11. The galley system of claim 1, further comprising an air stop valve for discharging condensate from a duct connected to the air extraction means.

12. A method for operating electrical galley devices, comprising the steps of:
    extracting air from a compartment arranged in a galley system through an already existing air extraction means in a galley system, in which at least one air breathing fuel cell is arranged, allowing to draw at least a part of heat generated in a fuel cell process during air extraction by constantly providing a sufficient flow of air with a comparably low temperature over a heat dissipating surface in thermal contact with the at least one fuel cell,
    operating the at least one fuel cell under removal of at least a part of heat emanating from the at least one fuel cell through the air extraction, and
    supplying electrical power to at least one electrically operated galley device.

13. The method of claim 12, further comprising the step of providing supplemental cooling through conveying a cooling fluid from a first heat exchanger, which is coupled with the at least one fuel cell unit, to a heat sink.

14. The method of claim 12, further comprising the step of transferring heat from the at least one fuel cell unit to a first side of a Peltier element and thermally coupling a second side of the Peltier element with a heat sink in order to generate electrical power.

* * * * *